Nov. 4, 1969  PAUL-OTTO CLAUSSEN  3,475,943
STRETCHING MACHINES
Filed Sept. 18, 1967
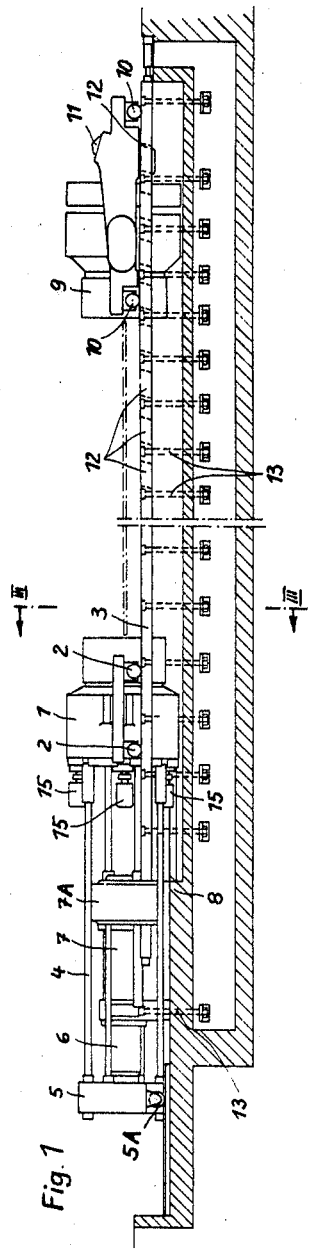
Fig.1
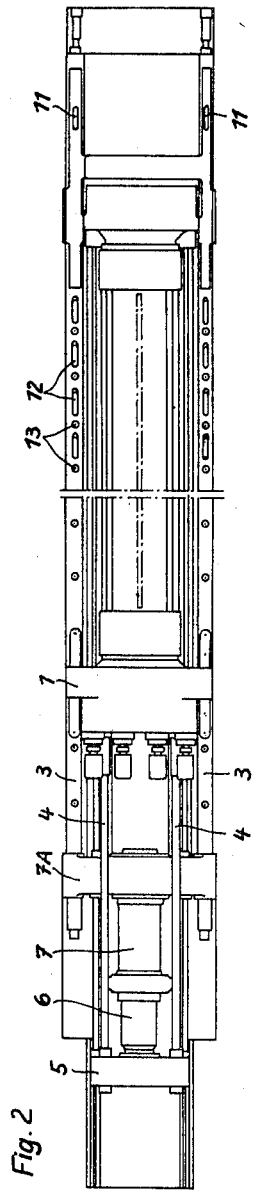
Fig.2
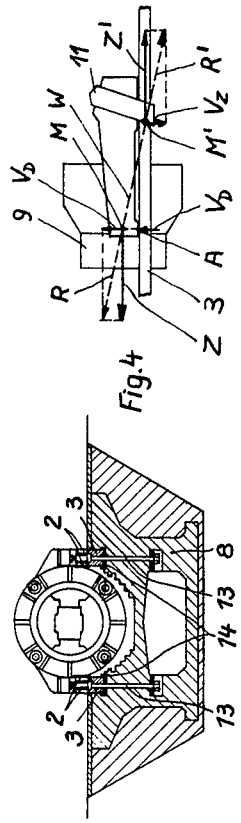
Fig.4
Fig.3
INVENTOR.
Paul-Otto Claussen
BY
Attorneys United States Patent Office
3,475,943
Patented Nov. 4, 1969

3,475,943
STRETCHING MACHINES
Paul-Otto Claussen, Schiefbahn, Germany, assignor to Schloemann Aktiengesellschaft, Dusseldorf, Germany, a company of Germany
Filed Sept. 18, 1967, Ser. No. 668,614
Claims priority, application Germany, Sept. 29, 1966, Sch 39,598
Int. Cl. B21d 11/07, 11/14
U.S. Cl. 72—297
4 Claims

ABSTRACT OF THE DISCLOSURE

A stretching machine for stretching sheet or plate material or for stretching and untwisting bar material, comprising a stretching grip, with stretching drive, and a counter-grip, all mounted upon a foundation or other substructure, designed for withstanding not only the weight of the machine but also the bending moment arising from the stretching operation, one or more eccentrically arranged thrust beams supporting a stretching-cylinder crossbar and the counter-grip, and connecting elements for the transmission of the bending moments.

The thrust beams are protected against buckling. Means are also provided for adjustably locking the counter-grip to the thrust beams.

---

This invention relates to a stretching machine for stretching sheets and plates, and for stretching and untwisting bar material, comprising a foundation, a stretching grip, a stretching drive including a stretching cylinder and a stretching-cylinder crossbar, and a counter-grip, all mounted upon the foundation, at least one thrust beam extending between and supporting the stretching-cylinder crossbar and the counter grip eccentrically in relation to the stretching axis of the machine, the foundation being so dimensioned as to be capable not only of supporting the weight of the machine but also of withstanding the bending moment imposed upon it by the eccentricity of the thrust beam in relation to the stretching axis.

There are section-stretching machines and plate-stretching machines. The former serve for stretching and untwisting sectional and bar material, the latter serve for stretching plates or sheets.

The two ends of the material to be stretched are clamped in two grips, the stretching grip and the counter-grip. The stretching grip is then moved away from the counter-grip, usually by hydraulic means, until the desired stretching effect is obtained, in which case, it may be, an untwisting takes place.

For carrying out the stretching operation, it is necessary that the driving of the stretching grip, that is, in general, the stretching cylinder, and the counter-grip, should be both frictionally and positively connected with one another, that the connection should be capable of taking up all the reactions from the stretching force and its position. The connection may be established in various ways.

It is very usual to make the connection by means of two thrust bars, which are arranged symmetrically about the centre of the machine, that is to say, symmetrically about the centre of gravity of the material to be stretched, and which therefore lie in one plane with the said material. In this case they may be provided in a horizontal or vertical plane, or in planes located between the two. The connection by three, four or more thrust bars is also constructionally equivalent, if the centre of gravity of all the thrust-bar surfaces coincides with the centre of the machine. The advantage of this method of construction resides in the fact that these thrust bars are in practice stressed only by normal compressive stressing fiom the reaction to the stretching force. A serious disadvantage of this method of construction resides however in the poor accessibility of the machine, since with any symmetrical arrangement of the thrust bars anywhere, the manipulating of the material that is being stretched, and also the access of the operating staff to the centre of the machine, is materially hindered.

If the accessibility of the machine is to be improved, only one arrangement of the connection is admissible, in which the centre of gravity of this connection lies outside the centre of the machine.

The usual eccentric connection is that by a rigid frame, which is arranged more or less far from the machine centre. This frame must take up the reaction to the stretching force as a thrust acting at the centre of gravity of the frame, and additionally also the bending moment which occurs owing to the non-co-axial position of the stretching force and the reaction force. The compressive stress distributed uniformly over the cross-section of the frame is thus superimposed upon the known distribution of the bending stress, the bending moment being obtained from the stretching force multiplied by the distance between the centre of the grip and the centre of gravity of the frame. This method of construction is however relatively expensive, since in spite of the possibility of shaping the frame cross-section unsymmetrically and adapting it to the stress distribution, large regions of the frame are always poorly utilised as regards strength, namely the regions around the centre of gravity. Furthermore, this method of construction is expensive because the frame cross-section and the bending moment are dependent upon one another. For with the dimensioning of the frame, upon the adoption of an enlarged frame cross-section, the bending moment loading this cross-section increases at the same time.

A less costly method of construction, which also constitutes an eccentric connection, is known under the name "tension-band construction." In this case the cylinder crossbeam of the stretching grip is firmly connected with the foundation by way of a king-pin. The counter-grip, which, on account of the differing lengths of material to be stretched, is displaceable on rollers along the axis of the machine, is releasably secured by means of locking bolts in locking apertures which are arranged spaced apart in a tension band located upon or in the foundation. This tension band, equipped with a corresponding cross-section, transmits the stretching force to the foundation by way of a king-pin located at its rear end. Hence the foundation must take up the reaction to the stretching force as a thrust acting at the centre of gravity of the foundation, and also the bending moment from the stretching force, multiplied by the distance between the centres of gravity of the tension band and the foundation, and the bending moment accruing only at times in the region between the two grips, from the stretching force multiplied by the distance between the centre of the machine and the centre of gravity of the tension band. This last bending moment is here fed into the foundation by two opposite vertical reaction forces of the counter-grip.

On account of the considerable wear of the foundation as a machine member, this method of construction is subject to economic limits, which lie at stretching forces of about 400 tons.

The object of the invention is to provide a construction of stretching machine which still renders economical solutions possible for stretching forces of any magnitude, with a quality of accessibility which can be freely selected, and which therefore renders possible the building of a machine which possesses an eccentric connection of clamping cylinder and counter-grip, but which does not have an expensive frame, and in which the reaction to the stretching force is not passed through the foundation.

This problem is solved, according to the invention, in a stretching machine of the kind set forth by providing guides between which the thrust beam is slidable, so as to prevent it from buckling laterally, and by providing swingable tie rods connecting the thrust beam with the foundation, so as to prevent the thrust beam from buckling vertically, these tie rods also transmitting to the foundation the vertical component of the bending moment arising at the stretching cycliner and at the counter-grip.

In consequence of the frictional and positive connection of stretch cylinder and counter-grip by compression members arranged eccentrically to the centre of the machine, which are connected with the sub-structure without shear and with prevention of buckling, the result is advantageously obtained that the compression member or members, or in other words the thrust beams, are brought in solely for taking up the reaction to the stretching force. The bending moment which results from the stretching force multiplied by the distance between the centre of the machine and the centre of gravity of the thrust beam, is not taken up by the thrust beams, or at least not in the direction of the thrust.

The thrust beam or beams contain, in a further development of the invention, locking apertures for the stepwise adjusting of the counter-grip, and the securing element or elements of the counter-grip engage in these apertures. Hence it is ensured in the simplest manner that even when stretching material of different lengths, the reactions to the stretching forces are taken up directly by the thrust beams.

In order to enable the stretching forces to be appropriately transmitted by way of the counter-grip, the securing elements of the counter-grip, in a further development of the invention, and the locking apertures in the thrust beams, are arranged at an inclination to the thrust beams, in such a way that the obliquity extends perpendicularly or almost perpendicularly to the line of action of the two resultants, acting at the counter-grip, of the external forces; and the thrust beams, for the further transmission of the bending moment of the counter-grip, are connected with the sub-structure or foundation by tension elements. It is as tension elements for this connection of the thrust beams with the sub-structure or foundation, for the further transmission of the vertical pull from the bending moment of the counter-grip, that the aforementioned swingable tie rods are provided, which are arranged between the connecting element and the thrust beam in the immediate neighbourhood of the particular power-transmission point.

The bending moment arising during the stretching operation is transmitted only in the form of two opposite transverse forces, on the one hand directly and on the other hand transversely, by the thrust beams, by contact or by way of swingable tie rods, into the sub-structure or foundation, which is designed for taking up this bending moment. The thrust beams here are stressed in compression only perpendicularly to the direction of the compressive force, and transiently in bending.

By this construction of an eccentric connection between the stretching cylinder and the counter-grip, therefore, the stresses of this connection are advantageously organised. The reaction to the stretching force is taken up only by the thrust beam or beams, and the bending moment only by the foundation.

It is particularly advantageous here that the bending moment is not dependent upon the cross-section of the sub-structure or foundation that takes up this moment, since here the distance that determines the bending moment, namely the distance between the centre of the machine and the centre of gravity of the thrust beam, is not influenced by the cross-section of the foundation. Furthermore the swingable tie rods arranged in the thrust beams and connecting the latter with the foundation advantageously render possible the freedom from shear of the thrust beams to the sub-structure or foundation which is necessary for the organization of the taking up of the reaction, and the transmission, required at the counter-grip, of the tensile force of the transverse-force couple into the foundation.

The thrust beam or beams can be very simply and economically constructed, and the sub-structure or foundation, which is in any case requisite for any machine, becomes in this case, by an immaterially increased expenditure, a simple machine part. An expensively constructed frame is not required.

One embodiment of the invention is illustrated by way of example in the accompanying drawings, in which:

FIGURE 1 shows a view of a section-stretching machine, partly in section;

FIGURE 2 shows a plan view of the machine;

FIGURE 3 shows a section through the machine on the line III—III in FIGURE 1; and FIGURE 4 shows the distribution of the external forces at the counter-grip.

The stretching grip 1 is displaceable upon rollers 2, which run upon thrust beams 3, and is connected by way of tension rods 4 and a crossbar 5, running upon rollers 5A, with a stretching piston 6. The stretching piston 6 is slidable in a stretching cylinder 7, which is connected directly by way of swingable tie rods 13 with the foundation 8, and, by way of a stretching-cylinder crossbar 7A, with thrust beams 3. A counter-grip 9, which is likewise displaceable upon rollers 10 upon the thrust beams 3, is releasably secured in the thrust beams 3 by means of locking pieces 11, which engage in locking apertures 12 in the thrust beams 3, for the purpose of transmitting the stretching forces. The thrust beams 3 are connected without shear, with the foundation 8, by the swingable tie rods 13, and are supported in guides 14 to prevent lateral buckling. Furthermore, for the untwisting of bar-like material, the grip 1 is rotatably mounted. The driving for rotation is effected by way of motors 15 arranged on the periphery of the grip 1.

The counter-grip 9 in FIGURE 4 is secured in the thrust beams 3 by means of locking pieces 11. The stretching force Z, in consequence of eccentric supporting upon a seating A, exerts a compressive force $V_D$, which is displaced along its line of action as far as the section M with the line of action of the stretching force Z, and forms with Z, the resultant R. In the point M', at the contact edge between the locking piece 11 and the centre of gravity of the thrust beams 3, the reactions Z' and $V_Z$ act, their resultant R' being equal in magnitude and opposite in direction to R, and extending in the same line of action W. The locking piece 11 is arranged perpendicularly or almost perpendicularly to the line of action W.

I claim:

1. A stretching machine for stretching sheets and plates, and for stretching and untwisting bar-shaped material, comprising a foundation, a stretching grip, a stretching drive including a stretching cylinder and a stretching cylinder crossbar, and a counter-grip, all mounted upon the foundation, at least one thrust beam extending between and supporting the stretching cylinder crossbar and the counter-grip eccentrically in relation to the stretching axis of the machine, the foundation being so dimensioned as to be capable not only of supporting the weight of the machine but also of withstanding the bending moment imposed upon it as a consequence of the eccentricity between the stretching axis of the machine and the thrust beam, guides located between the thrust beam and the foundation and adapted to prevent lateral buckling of the thrust beam, the thrust beam being slidable in these guides, swingable tie rods connecting the foundation with the thrust beam and with the stretching cylinder and adapted to transmit to the foundation the vertical component of the bending moment arising at the stretching cylinder and the counter-grip.

2. A stretching machine as claimed in claim 1, further comprising locking elements for the counter-grip, the thrust beam being formed with locking apertures in any one of which the said locking elements can adjustably engage.

3. A stretching machine as claimed in claim 2, the locking elements that secure the counter-grip to the thrust beam, and the locking apertures in the thrust beam, being obliquely arranged, at an inclination that is substantially perpendicular to the line of action of the resultants of the external forces acting at the counter-grip.

4. A stretching machine as claimed in claim 2, the swingable tie rods connecting the thrust beam with the foundation being located in the immediate neighbourhood of the associated locking elements.

References Cited

UNITED STATES PATENTS

| 2,164,343 | 7/1939 | Nighthart | 72—299 |
| 2,715,431 | 8/1955 | Crossu | 72—299 |
| 3,349,598 | 10/1967 | Pollak | 72—297 |

RONALD D. GREFE, Primary Examiner

U.S. Cl. X.R.

72—299